(12) United States Patent
Bertoldi et al.

(10) Patent No.: US 11,536,174 B2
(45) Date of Patent: Dec. 27, 2022

(54) ACOUSTIC DAMPER FOR GAS TURBINE COMBUSTORS WITH ORTHOGONAL SLOTS

(71) Applicants: PRESIDENT AND FELLOWS OF HARVARD COLLEGE, Cambridge, MA (US); SIEMENS CANADA LIMITED, Oakville (CA)

(72) Inventors: Katia Bertoldi, Somerville, MA (US); Farhad Javid, Somerville, MA (US); Genevieve Bourgeois, Hampstead (CA); François-Xavier Jette, Longueuil (CA); Minh Quan Pham, Lachine (CA); Ali Shanian, Montreal (CA); Megan Schaenzer, Dollard-des-Ormeaux (CA)

(73) Assignees: President and Fellows of Harvard College, Cambridge, MA (US); Siemens Canada Limited

( * ) Notice: Subject to any disclaimer, the term of this patent is extended or adjusted under 35 U.S.C. 154(b) by 320 days.

(21) Appl. No.: 16/632,147

(22) PCT Filed: Jul. 19, 2018

(86) PCT No.: PCT/US2018/042928
§ 371 (c)(1),
(2) Date: Jan. 17, 2020

(87) PCT Pub. No.: WO2019/018673
PCT Pub. Date: Jan. 24, 2019

(65) Prior Publication Data
US 2020/0232357 A1 Jul. 23, 2020

Related U.S. Application Data

(60) Provisional application No. 62/534,767, filed on Jul. 20, 2017.

(51) Int. Cl.
*F01N 1/02* (2006.01)
*F01N 1/04* (2006.01)
(Continued)

(52) U.S. Cl.
CPC ............. *F01N 1/026* (2013.01); *F01N 1/023* (2013.01); *F01N 1/04* (2013.01); *F01N 1/10* (2013.01); *F02C 7/24* (2013.01); *F01N 2490/14* (2013.01)

(58) Field of Classification Search
CPC ......... F05D 2260/964; F05D 2260/963; F05B 2260/00014; F23M 20/005; F01N 1/023;
(Continued)

(56) References Cited

U.S. PATENT DOCUMENTS 3,948,346 A 4/1976 Schindler
4,035,535 A 7/1977 Taylor
(Continued)

FOREIGN PATENT DOCUMENTS

EP       1 950 357 B1   8/2010
WO   WO 2016/112367 A2   7/2016
WO   WO 2016/112368 A1   7/2016

OTHER PUBLICATIONS

M Long, Architectural Acoustics, 2014, Chapter 7 Sound and Solid surfaces P. 359-312.*

(Continued)

*Primary Examiner* — Todd E Manahan
*Assistant Examiner* — Rodolphe Andre Chabreyrie
(74) *Attorney, Agent, or Firm* — Nixon Peabody LLP (57) ABSTRACT

An acoustic damper includes a low porosity layer section and a housing. The low porosity layer section is formed in a liner of a gas turbine combustor and has an arrangement of elongated generally S-shaped slots formed therein. The housing has a plurality of feed apertures. The housing is coupled to the low porosity layer section thereby defining a cavity such that air outside the housing is configured to flow through the apertures and through the elongated generally S-shaped slots in the low porosity layer section, thereby transforming acoustic energy into thermal energy and aiding in providing an acoustic dampening effect for the gas turbine combustor during operation thereof.

13 Claims, 8 Drawing Sheets

(51) Int. Cl.
 *F01N 1/10* (2006.01)
 *F02C 7/24* (2006.01)
(58) Field of Classification Search
 CPC . F01N 1/02; F01N 1/026; F23R 3/002; F02K 1/82
 See application file for complete search history.

(56) References Cited

U.S. PATENT DOCUMENTS

| | | | |
|---|---|---|---|
| 2005/0034918 A1* | 2/2005 | Bland | F23M 20/005 181/266 |
| 2007/0272483 A1 | 11/2007 | Morin | |
| 2009/0084100 A1 | 4/2009 | Johnson | |
| 2011/0138812 A1 | 6/2011 | Johnson | |
| 2011/0220433 A1 | 9/2011 | Nakamura | |
| 2013/0074501 A1* | 3/2013 | Tiwary | F01N 1/023 29/889.22 |
| 2014/0260281 A1* | 9/2014 | Innes | B23K 35/228 83/49 |
| 2015/0020498 A1* | 1/2015 | Schilp | F01D 9/023 60/39.83 |
| 2018/0180288 A1* | 6/2018 | Kugimiya | F23R 3/42 |

OTHER PUBLICATIONS

Extended European Search Report in European Patent Application No. EP 18835586.1, dated Feb. 9, 2021 (8 pages).

International Search Report and Written Opinion in International Application No. PCT/US2018/042928 dated Sep. 14, 2018 (6 pages).

* cited by examiner

ACOUSTIC DAMPER FOR GAS TURBINE COMBUSTORS WITH ORTHOGONAL SLOTS

CROSS-REFERENCE TO RELATED APPLICATIONS

This application is a U.S. National Stage Application of International Application No. PCT/US2018/042928, filed Jul. 19, 2018, which claims priority to U.S. Provisional Patent Application No. 62/534,797, filed Jul. 20, 2017, both of which are hereby incorporated by reference herein in their entireties.

FIELD OF THE PRESENT DISCLOSURE

The present disclosure relates to acoustic dampers for gas turbine combustors, more particularly, to acoustic dampers for gas turbine combustors with orthogonal slots.

BACKGROUND

Enclosed vessels like gas turbine combustors and afterburners frequently give rise to high amplitude pressure fluctuation that can damage the vessel. A common approach to dampen such pressure fluctuations is to either apply round holes to the enclosure itself when practical or use a perforated liner (e.g., a liner with round holes) some distance away from the internal surface of the enclosure. Typically, when pressure waves interact with this perforated liner, the pressure differential created across the liner converts the energy contained in the unsteady pressure field into velocity or mass flow fluctuations of the medium in these perforations. This oscillating mass flow produces vortex shedding that transforms a portion of the acoustic energy into heat via viscosity in the shear layers and turbulence. This is the underlying mechanism of dampers and mufflers.

In certain applications, such as gas turbine combustors, the cooling air flowing through the liner and hence the liner's porosity is limited by the amount of air available for cooling and the amount of air required for combustion within the gas turbine combustor. Space limitations can also limit the use and/or placement of an acoustic damper and/or its housing/cavity (e.g., resonating cavity). Further, the thermal and stress performance of an acoustic damper limits the acoustic damper's positioning about the vessel. That is, acoustic dampers have limitations on their placement about the vessel, which can lead to a less than desirable placement, especially when the acoustic damper is desired to be placed directly adjacent to a flame area.

The present disclosure is directed to solving these problems and addressing other needs.

SUMMARY OF THE PRESENT DISCLOSURE

The present disclosure is directed to acoustic dampers or resonators for gas turbine combustors with a low porosity layer having apertures therein that are not round (e.g., circles), but elongated apertures or slots (e.g., a low porosity layer with a high aspect ratio) and orthogonal (e.g., where adjacent ones of the elongated apertures or slots are orthogonal to one another). Examples of elongated apertures are elongated slots or slits, elongated S-shaped slots or slits or channels, etc. Elongated orthogonal apertures or slots provide advantages over round apertures or holes that are useful in an acoustic damper, such as, for example:

improved cooling function;
reduced thermal stresses, thereby reducing the propensity for cracking; and
increased acoustic damping (e.g., at frequencies higher than the resonating frequency of the resonating cavity/housing).

With the improved cooling function of the acoustic dampers of the present disclosure, the required amount of cooling air consumed by the acoustic dampers of the present disclosure can be minimized, such as, for example, in order to reduce NOx emissions in premixed combustors. The improved cooling can also improve the life of the acoustic damper by providing increased relative cooling when the amount of cooling air is kept the same as for an acoustic damper with round holes.

The reduced thermal stresses and increased acoustic damping can increase the life of the acoustic damper as compared to an acoustic damper with round holes (i.e., not elongated apertures or slots like the present disclosure). The acoustic damping provided by elongated orthogonal apertures or slots was surprisingly found to be equivalent or better to that of round holes for a range of conditions/applications when the effective area (or discharge coefficient) of the elongated orthogonal apertures or slots was equivalent to the effective area of the round holes:

single or multiple-skin dampers;
various damping cavity volumes (hence resonance frequency);
various bias flow pressure drops;
various slot width, length, and spacing (i.e. various porosities);
various damper layer thickness;
various cooling hole angle with respect to the damper surface;
damping of waves incident or tangential to the damper surface;
various grazing flow velocities (including no flow); and
various grazing flow temperatures.

Further, elongated orthogonal apertures or slots have been found to provide better damping than round holes in acoustic dampers with a cavity for frequencies above the resonance frequency of the resonating cavity.

A common drawback of using elongated shaped apertures in acoustic dampers or generally is their propensity to exhibit stress concentration at certain locations (e.g., at the ends of a straight slot). However, the present disclosure is directed to elongated shapes that do not possess this weakness. For example, slots shaped like the letter "S" have the advantages of the elongated shapes without the high stress concentration (e.g., at the ends of a straight slot).

In some implementations of the present disclosure, a bias flow is applied to the acoustic damper to increase a shear layer and turbulence intensities and promote the formation of vortices surface area and turbulence intensity, thus maximizing the amount of acoustic energy dissipated by viscous losses.

In some implementations, to further increase mass flow fluctuations, a cavity (e.g., a resonating cavity or housing) is placed behind the perforated liner to induce resonances at specific target frequencies (e.g., the volume of the resonating cavity/housing is tuned/designed to attenuate acoustic energy at a specific resonating frequency and/or range/band of frequencies).

In some implementations, to increase the amount of the dissipated/attenuated acoustic energy, the number and/or size of the apertures (e.g., the liner porosity) is adjusted.

According to some implementations of the present disclosure, an acoustic damper system for a gas turbine combustor includes a first low porosity layer section, a first housing, a second low porosity layer section, and a second housing. The first low porosity layer section is formed in a liner of the gas turbine combustor. The first low porosity layer section has a first arrangement of elongated generally S-shaped slots formed therein. The first housing has a first plurality of feed apertures. The first housing is coupled to the first low porosity layer section thereby defining a first cavity. Air outside the first housing is configured to flow through at least a portion of the first plurality of feed apertures in the first housing and through at least a portion of the first arrangement of elongated generally S-shaped slots in the first low porosity layer, thereby transforming a first range of frequencies of acoustic energy into thermal energy and aiding in providing an acoustic dampening effect on the first range of frequencies of acoustic energy for the gas turbine combustor during operation thereof. The second low porosity layer section is formed in the liner of the gas turbine combustor. The second low porosity layer section has a second arrangement of elongated generally S-shaped slots formed therein. The second housing has a second plurality of feed apertures. The second housing is coupled to the second low porosity layer section thereby defining a second cavity. Air outside the second housing is configured to flow through at least a portion of the second plurality of feed apertures in the second housing and through at least a portion of the second arrangement of elongated generally S-shaped slots in the second low porosity layer, thereby transforming a second range of frequencies of acoustic energy into thermal energy and aiding in providing an acoustic dampening effect on the second range of frequencies of acoustic energy for the gas turbine combustor during operation thereof.

According to some implementations of the present disclosure, an acoustic damper for a gas turbine combustor includes a low porosity layer section and a housing. The low porosity layer section is formed in a liner of the gas turbine combustor. The low porosity layer section has an arrangement of elongated generally S-shaped slots formed therein. Each of the elongated generally S-shaped slots of the arrangement has a major axis. The major axes of a first plurality of the elongated generally S-shaped of the arrangement slots being generally perpendicular to the major axes of a second plurality of the elongated generally S-shaped slots of the arrangement. The housing has a plurality of feed apertures. The housing is coupled to the low porosity layer section thereby defining a cavity. Air outside the housing is configured to flow through at least a portion of the plurality of feed apertures in the housing and through at least a portion of the elongated generally S-shaped slots in the low porosity layer section, thereby transforming acoustic energy into thermal energy and aiding in providing an acoustic dampening effect for the gas turbine combustor during operation thereof.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 1:
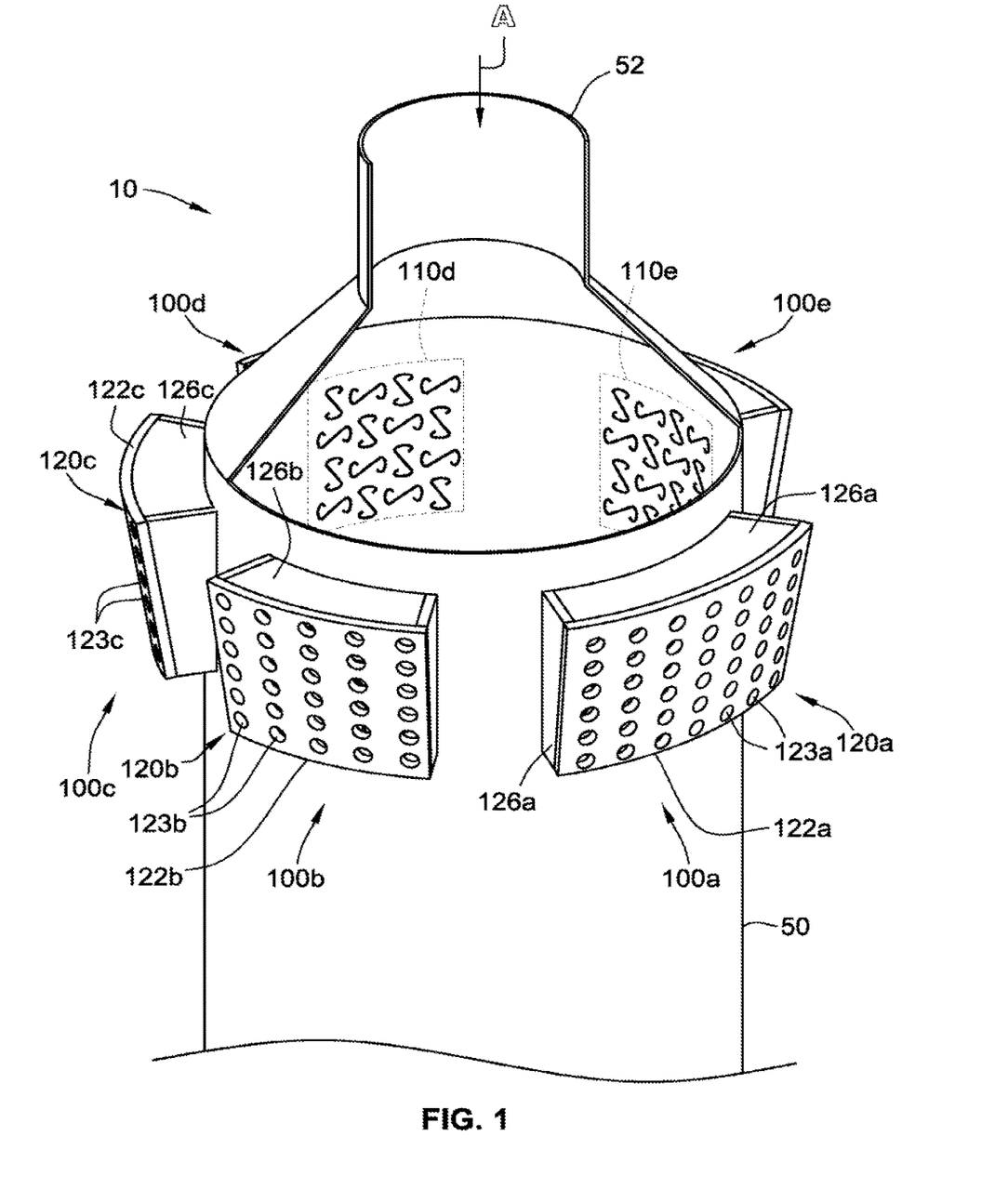
FIG. 1 is an assembled perspective view of an acoustic damper system according to some implementations of the present disclosure.
Figure 2:
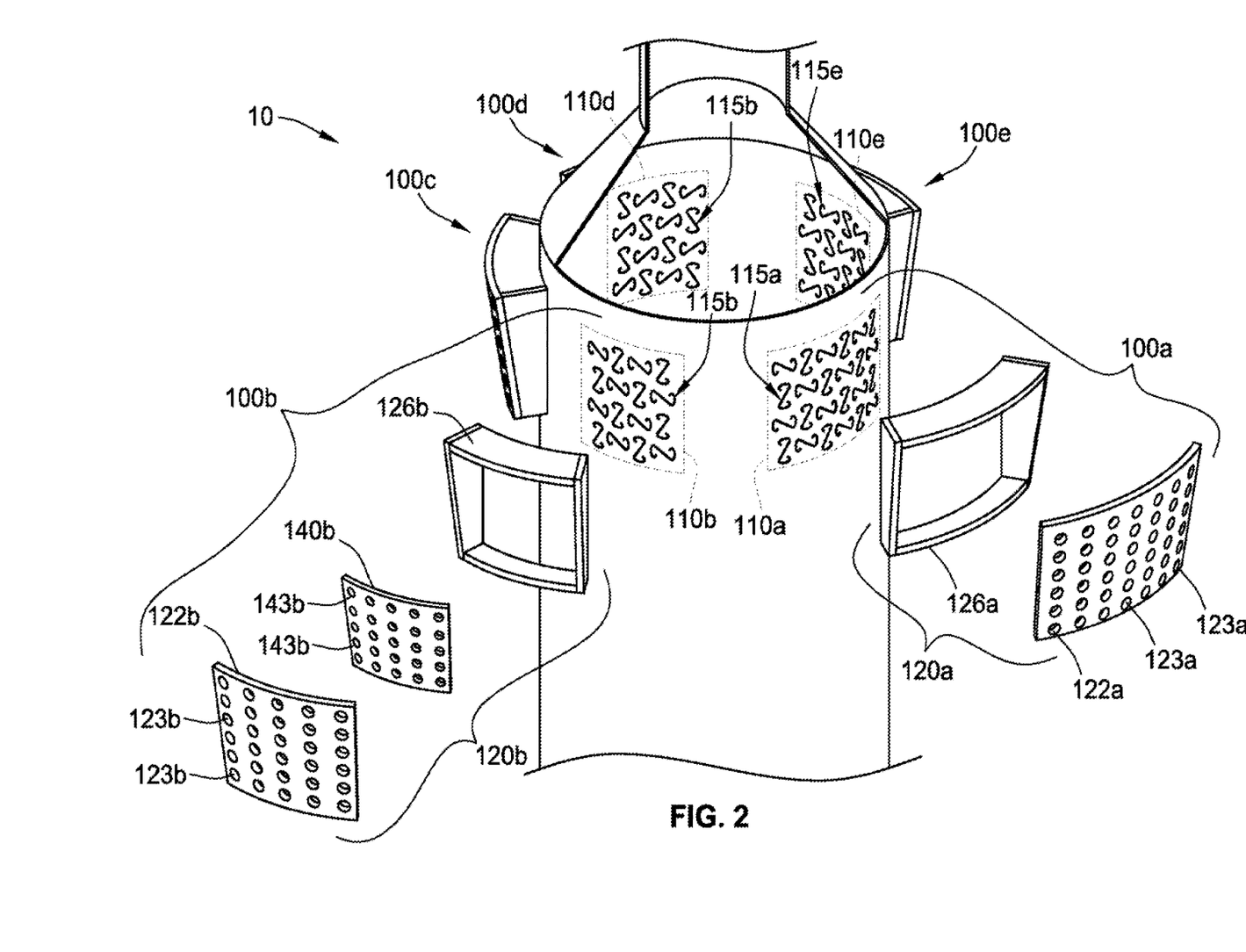
FIG. 2 is a partially exploded perspective view of the acoustic damper system of FIG. 1.
Figure 3:
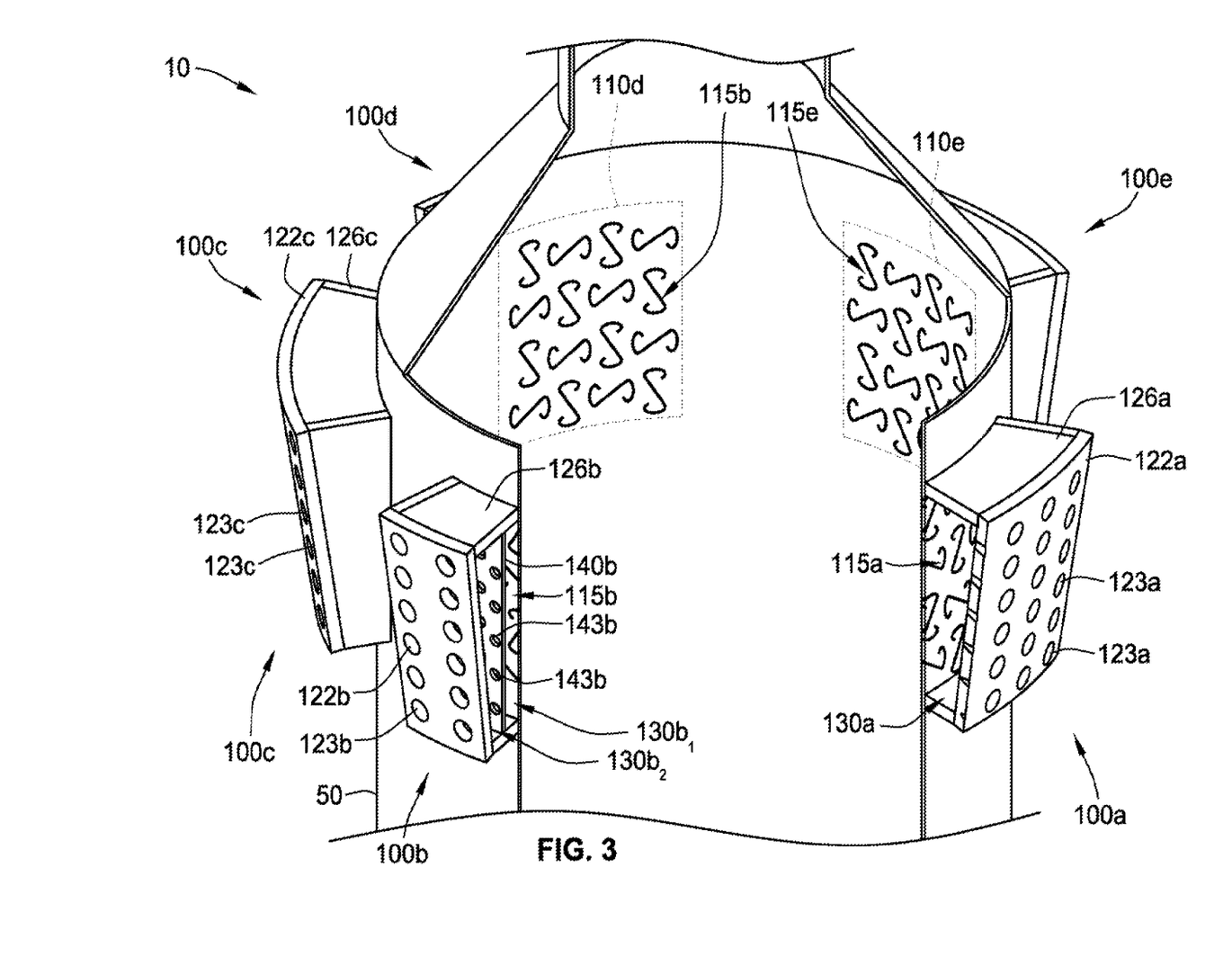
FIG. 3 is a partial cross-sectional perspective view of the acoustic damper system of FIG. 1.

Referring generally to FIGS. 1-3, an acoustic damper system 10 includes a multitude of acoustic dampers 100a-e positioned about a liner 50 of a gas turbine combustor (not shown). While five acoustic dampers 100a-e are shown, the acoustic damper system 10 can include any number of acoustic dampers (e.g., one acoustic damper, two acoustic dampers, three acoustic dampers, ten acoustic dampers, fifty acoustic dampers, one hundred acoustic dampers, etc.). It is noted that in FIGS. 1-3 and 6, an upper-front portion of the liner 50 is removed for illustrative purposes.

A first heat or flame region/area of the gas turbine combustor is generally above and/or within an upper end 52 of the liner 50 with a direction of heat and/or fire flowing in the direction of arrow A. In some implementations, a second heat or flame region/area of the gas turbine combustor is positioned within the liner 50 downstream of the first heat of flame region/area with a direction of heat and/or fire flowing in the direction of arrow A. In such implementations, the second heat or flame region/area of the gas turbine combustor can be used in addition to the first heat or flame region/area of the gas turbine combustor to increase power of the gas turbine combustor while permitting better control of the internal temperature of the gas turbine combustor, which aids in the reduction of emissions of the gas turbine combustor (e.g., reduce nitrous oxide "NOx" gas emissions).

The heat or flame region(s)/area(s) of the gas turbine combustor generally produce the highest acoustic amplitude of the gas turbine combustor. As the heat/fire flows within the liner 50, the liner 50 and anything coupled thereto becomes hot and is subjected to acoustic pressure fluctuations (e.g., noise/sound) caused or made by the gas turbine combustor. In an effort to dampen (e.g., reduce and/or eliminate) such acoustic pressure fluctuations, the acoustic dampers 100a-e are coupled to and positioned about the liner 50, for example, as shown in FIG. 1. In some implementations as shown in FIG. 1, one or more of the acoustic dampers 100*a-e* are positioned directly adjacent to the second flame region/area of the gas turbine combustor to provide acoustic dampening (e.g., an acoustic dampening effect), although one or more acoustic dampers of the present disclosure can be positioned directly adjacent to the first flame region/area too. As described herein, the acoustic dampers 100*a-e* of the present disclosure are more versatile in terms of placement on/about the liner 50 as compared to prior acoustic dampers at least because each of the acoustic dampers 100*a-e* of the present disclosure includes a low porosity layer section with elongated generally S-shaped slots (e.g., not circular apertures like prior acoustic dampers) having the advantages noted herein (e.g., better relative cooling, reduced thermal stresses/better stress dissipation, better relative acoustic damping, etc.).

Each of the acoustic dampers 100*a-e* in the acoustic damper system 10 is different in that each one of the acoustic dampers 100*a-e* is tuned/designed to dampen a specific frequency or range/band of frequencies of acoustic energy. For example, a first acoustic damper 100*a* is tuned/designed to dampen a first range/band of frequencies of acoustic energy (e.g., between 1500 Hz and 1600 Hz); a second acoustic damper 100*b* is tuned/designed to dampen a second range/band frequencies of acoustic energy (e.g., between 1800 Hz and 2000 Hz); a third acoustic damper 100*c* is tuned/designed to dampen a third range/band of frequencies of acoustic energy (e.g., between 1900 Hz and 2400 Hz); a fourth acoustic damper 100*d* is tuned/designed to dampen a fourth range/band of frequencies of acoustic energy (e.g., between 2400 Hz and 2500 Hz); and a fifth acoustic damper 100*d* is tuned/designed to dampen a fifth range/band of frequencies of acoustic energy (e.g., between 1500 Hz and 2500 Hz). In some implementations, one or more of the acoustic dampers 100*a-e* are the same and/or tuned/designed to dampen the same frequency or range/band of frequencies. As evident by the above examples, in some implementations, the first range/band of frequencies of acoustic energy and the second range of frequencies of acoustic energy are different. In some implementations, one or more of the ranges of frequencies of acoustic energy partially overlap and/or completely overlap. In some implementations, one or more or all of the ranges of frequencies of acoustic energy do not overlap at all. In some implementations, one or more of the ranges of frequencies of acoustic energy overlap by a percentage, (e.g., less than 50 percent, less than 40 percent, less than 30 percent, less than 20 percent, less than 10 percent, less than 5 percent, less than 1 percent, etc.).

Referring to the first acoustic damper 100*a*, as best shown in FIG. 2, the first acoustic damper 100*a* includes a low porosity layer section 110*a* and a housing 120*a*. The low porosity layer section 110*a* is a generally square-shaped section of the liner 50 that includes an arrangement of slots 115*a* formed therein. While the low porosity layer section 110*a* is shown as having a generally square-shaped footprint, the footprint of the low porosity layer section 110*a* can have any shape and any size. For example, the footprint of the low porosity layer section 110*a* can have a generally square shape with rounded corners, a generally rectangular shape with rounded corners, a generally circular shape, a generally polygonal shape with rounded corners, a trapeze shape with rounded corners, a generally triangular shape with rounded corners, a generally hexagonal shape with rounded corners, or any combination thereof. Further, the footprint of the acoustic dampers 100*a-e* can be the same or different from one acoustic damper to the next.

The arrangement of slots 115*a* included in the low porosity layer section 110*a* is an arrangement of generally S-shaped slots 115*a*. Each of the elongated generally S-shaped slots of the arrangement of slots 115*a* has a major axis and two minor axes. The major axes (see e.g., $X_{MAJOR}$ of S-shaped slot 200 in FIG. 7) of a first group of the elongated generally S-shaped slots of the first arrangement of slots 115*a* are generally perpendicular to the major axes of a second group of the elongated generally S-shaped slots of the first arrangement of slots 115*a*. By "generally perpendicular" it is meant that the major axes are +/−20 degrees from being exactly perpendicular (i.e., exactly 90 degrees) relative to each other. That is, the major axes are between 70 degrees and 110 degrees relative to each other. Further, the first group of the elongated generally S-shaped slots and the second group of the elongated generally S-shaped slots are arranged in an array of rows and columns such that each of the rows and each of the columns alternate between the first group of elongated generally S-shaped slots and the second group of elongated generally S-shaped slots. As shown, the rows are equally spaced from each other and the columns are equally spaced from each other in the arrangement of generally S-shaped slots 115*a*, although one or more of the rows and/or one or more of the columns can have a different spacing. Measuring between centers (see e.g., center or origin, O, of S-shaped slot 200 in FIG. 7) of directly adjacent ones of the elongated generally S-shaped slots, the vertical spacing (e.g., the spacing between the rows) is between about five millimeters to about eight millimeters and the horizontal spacing (e.g., the spacing between the columns) is between about five millimeters to about eight millimeters, although various other spacing is contemplated (e.g., horizontal and/or vertical spacing between about three millimeters and about thirty millimeters).

Figure 7:
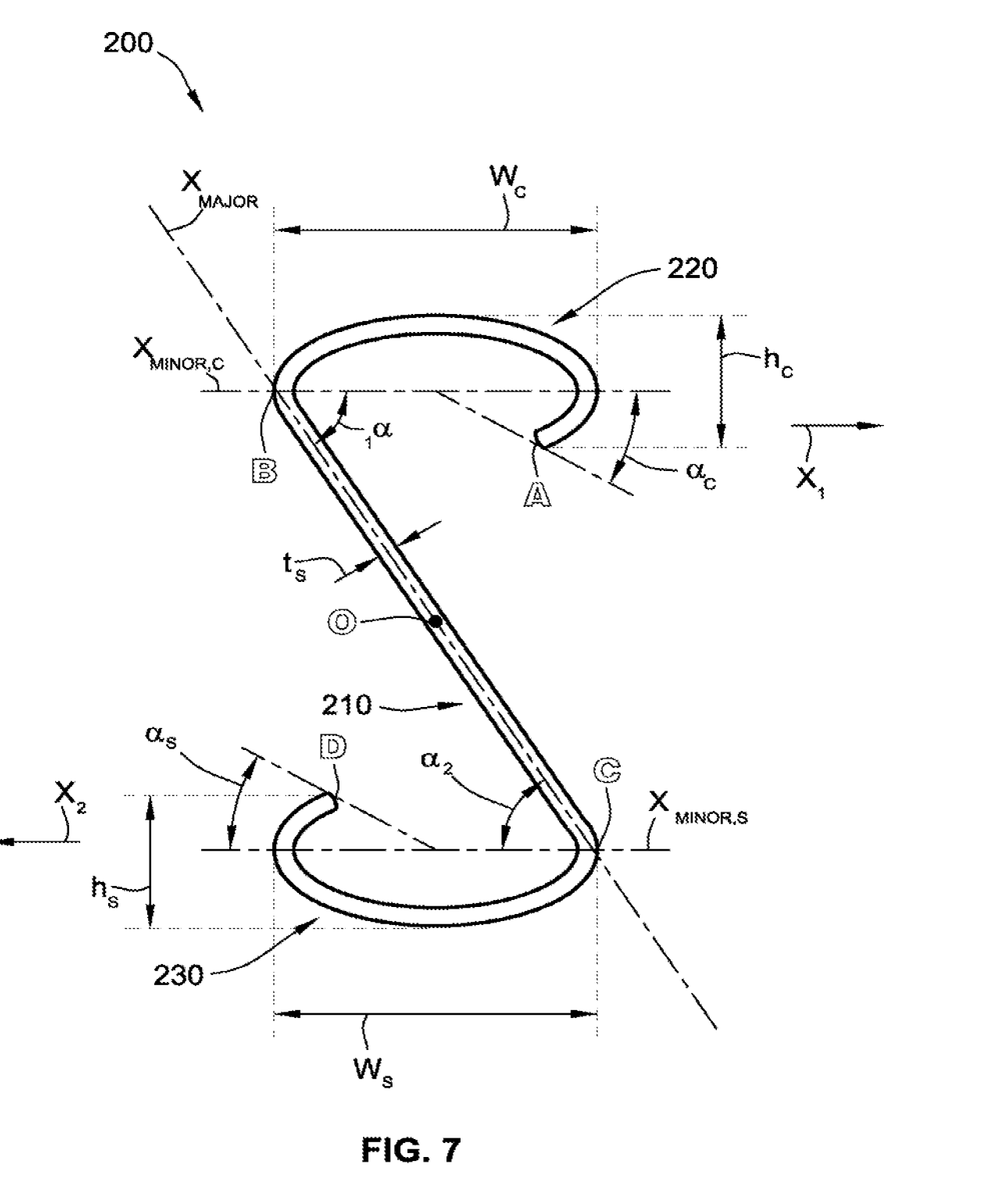
FIG. 7 is a plan illustrative view of an S-shaped slot of one of the low porosity layer sections of the liner of FIG. 6.

Referring to FIG. 7, an exemplary one of the S-shaped slots 115*a* from any of the arrangement of generally S-shaped slots 115*a-e* is shown as S-shaped slot 200 for illustrative and explanatory purposes. The S-shaped slot 200 has an elongated generally straight slot portion 210 extending between points B and C, where point B is at a first end of the elongated generally straight slot portion 210 and point C is at an opposing second end of the elongated generally straight slot portion 210. The elongated generally straight slot portion 210 of the S-shaped slot 200 corresponds to the major axis, $X_{MAJOR}$, of the S-shaped slot 200. Put another way, the major axis, $X_{MAJOR}$, of the S-shaped slot 200 is positioned through the longitudinal midline of the elongated generally straight slot portion 210. Further, along the major axis, $X_{MAJOR}$, the elongated generally straight slot portion 210 of the S-shaped slot 200 has a center or origin, O, which is the center of the S-shaped slot 200 and/or at the midpoint of the elongated generally straight slot portion 210. According to some implementations, the elongated generally straight slot portion 210 has a length between about three millimeters and about twenty millimeters.

The S-shaped slot 200 also has a first generally curved slot portion 220 extending between points A and B. As such, the first generally curved slot portion 220 is directly attached to the first end of the elongated generally straight slot portion 210 at point B. Further, the first generally curved slot portion 220 extends generally from the elongated generally straight slot portion 210 in the direction of arrow $X_1$ (e.g., a first direction). As shown, arrow $X_1$ is parallel to a first minor axis, $X_{MINOR,C}$, of the S-shaped slot 200, which is at a first angle, $\alpha_1$, with respect to the major axis, $X_{MAJOR}$, of the S-shaped slot 200. The first angle, $\alpha_1$, can be any angle, such as, for example, between about ten degrees and about ninety degrees; between about twenty degrees and about eighty degrees; between about forty degrees and about seventy degrees, etc. According to some implementations, the first generally curved slot portion 220 has a first arc length between about two millimeters and about ten millimeters.

In some implementations, the first generally curved slot portion 220 is formed to have the shape of a portion of an ellipse. As such, the first generally curved slot portion 220 can also be referred to as an ellipse cap as the first generally curved slot portion 220 forms a cap or top of the S-shaped slot 200 and has a shape that generally tracks the shape of a portion of an ellipse. The first generally curved slot portion 220 or the cap has a cap width, $w_c$, a cap height, $h_c$, and a cap rotation, $\alpha_c$, each of which helps to define the boundaries/parameters/shape of the first generally curved slot portion 220. The cap width, $w_c$, which is defined by a major axis of the cap (and which is on the first minor axis, $X_{MINOR,C}$, of the S-shaped slot 200), is between about 1.3 millimeters and about 3.0 millimeters. The cap height, $h_c$, which is defined by the cap rotation, $\alpha_c$, and a minor axis of the cap (which is perpendicular to the first minor axis, $X_{MINOR,C}$, of the S-shaped slot 200), is between about 0.9 millimeters and about 1.5 millimeters. The cap rotation, $\alpha_c$, ranges between about −20 degrees and 20 degrees. Thus, by varying the cap rotation, $\alpha_c$, the end point A is moved and the cap height, $h_c$, is adjusted.

The S-shaped slot 200 also has a second generally curved slot portion 230 extending between points C and D. As such, the second generally curved slot portion 230 is directly attached to the opposing second end of the elongated generally straight slot portion 210 at point C. Further, the second generally curved slot portion 230 extends generally from the elongated generally straight slot portion 210 in the direction of arrow $X_2$ (e.g., a second direction), which is opposite the direction of arrow $X_1$. As shown, arrow $X_2$ is parallel to a second minor axis, $X_{MINOR,S}$, of the S-shaped slot 200, which is at a second angle, $\alpha_2$, with respect to the major axis, $X_{MAJOR}$, of the S-shaped slot 200. The second angle, $\alpha_2$, can be the same as, or different from, the first angle, $\alpha_1$, and further can be any angle, such as, for example, between about ten degrees and about ninety degrees; between about twenty degrees and about eighty degrees; between about forty degrees and about seventy degrees, etc. According to some implementations, the second generally curved slot portion 230 has a second arc length between about two millimeters and about ten millimeters. While the arc lengths of the first generally curved slot portion 220 and the second generally curved slot portion 230 are shown as being the same, the arc lengths can be different. For example, the arc length of the first generally curved slot portion 220 can be shorter or longer than the arc length of the second generally curved slot portion 230.

In some implementations, similarly to the first generally curved slot portion 220, the second generally curved slot portion 230 is formed to have the shape of a portion of an ellipse. As such, the second generally curved slot portion 230 can be referred to as an ellipse shoe as the second generally curved slot portion 230 forms a shoe or bottom of the S-shaped slot 200 and has a shape that generally tracks the shape of a portion of an ellipse. The second generally curved slot portion 230 or the shoe has a shoe width, $w_s$, a shoe height, $h_s$, and a shoe rotation, $\alpha_s$, each of which helps to define the boundaries/parameters/shape of the second generally curved slot portion 230. The shoe width, $w_s$, which is defined by a major axis of the shoe (and which is on the second minor axis, $X_{MINOR,S}$, of the S-shaped slot 200), is between about 1.3 millimeters and about 3.0 millimeters. The shoe height, $h_s$, which is defined by the shoe rotation, $\alpha_s$, and a minor axis of the shoe (which is perpendicular to the second minor axis, $X_{MINOR,S}$, of the S-shaped slot 200), is between about 0.9 millimeters and about 1.5 millimeters. The shoe rotation, $\alpha_s$, ranges between about −20 degrees and 20 degrees. Thus, by varying the shoe rotation, $\alpha_s$, the end point D is moved and the shoe height, $h_s$, is adjusted.

The S-shaped slot 200 has a slot thickness, $t_S$, which can vary from slot to slot within a single low porosity layer section of a single acoustic damper and/or from acoustic damper to acoustic damper. As shown in FIG. 7, the slot thickness, $t_S$, of the S-shaped slot 200 is constant for the entirety of the S-shaped slot 200 (e.g., the thickness of the elongated generally straight slot portion 210, the thickness of the first generally curved slot portion 220, and the thickness of the second generally curved slot portion 230 are the same), although the thickness, $t_S$, can vary one or more times along the S-shaped slot 200. According to some implementations, the thickness, $t_S$, of the S-shaped slot 200 is between about 0.1 millimeters and about 0.3 millimeters. According to some other implementations, the thickness, $t_S$, of the S-shaped slot 200 is between about 0.19 millimeters and about 0.3 millimeters. According to some other implementations, the thickness, $t_S$, of the S-shaped slot 200 is between about 0.15 millimeters and about 0.28 millimeters.

The S-shaped slot 200 has a slot length, which can vary from slot to slot within a single low porosity layer section of a single acoustic damper and/or from acoustic damper to acoustic damper. The slot length of the S-shaped slot 200 is the total length of the entirety of the S-shaped slot 200 (e.g., the length of the elongated generally straight slot portion 210 plus the length of the first generally curved slot portion 220 plus the length of the second generally curved slot portion 230). According to some implementations, the slot length of the S-shaped slot 200 is between about 5 millimeters and about 50 millimeters. According to some other implementations, the slot length of the S-shaped slot 200 is between about 7 millimeters and about 40 millimeters. According to some other implementations, the slot length of the S-shaped slot 200 is between about 5 millimeters and about 20 millimeters.

When tuning/designing the acoustic damper 100a to dampen/attenuate a specific range/band of frequencies for a specific gas turbine combustor or the like, the parameters of the S-shaped slot 200 and/or the footprint of the low porosity layer can be customized. For example, the slot thickness, $t_S$, the slot length, the slot depth (defined by a thickness of the liner 50), the vertical spacing, and the horizontal spacing, or any combination thereof can be adjusted. In some implementations, the parameters of the S-shaped slot 200 for a particular acoustic damper having a low porosity layer section (e.g., low porosity layer section 110a) are designed such that the arrangement of elongated generally S-shaped slots (e.g., the low porosity layer section 110a) has a porosity below about twenty percent. In some other implementations, the parameters of the S-shaped slot 200 for a particular acoustic damper having a low porosity layer section (e.g., low porosity layer section 110a) are designed such that the arrangement of elongated generally S-shaped slots (e.g., the low porosity layer section 110a) has a porosity below about fifteen percent. In yet some other implementations, the parameters of the S-shaped slot 200 for a particular acoustic damper having a low porosity layer section (e.g., low porosity layer section 110a) are designed such that the arrangement of elongated generally S-shaped slots (e.g., the low porosity layer section 110a) has a porosity between about 0.5 percent and about three percent.

In some other implementations, the parameters of the S-shaped slot 200 for a particular acoustic damper having a low porosity layer section (e.g., low porosity layer section 110*a*) are designed such that the arrangement of elongated generally S-shaped slots (e.g., the low porosity layer section 110*a*) has a porosity between about three percent and about fifteen percent.

While the S-shaped slot 200 is shown and described as having a generally "S" shape, in some implementations, one or more of the S-shaped slots 200 can have a generally "Z" shape configuration where the "Z" shape is a mirror image of the "S" shape. Further it is noted that whether the S-shaped slot 200 appears to be an "S" or a "Z" depends on the viewing angle/position. Specifically, in some implementations, when viewing from the exterior of the liner 50, the S-shaped slot 200 appears to be an "S" while when viewing from the interior of the liner 50, the S-shaped slot 200 appears to be a "Z." Alternatively, in some implementations, when viewing from the exterior of the liner 50, the S-shaped slot 200 appears to be a "Z" while when viewing from the interior of the liner 50, the S-shaped slot 200 appears to be an "S." In some implementations, a single low porosity layer can have a mix of S-shaped slots where some have an "S" orientation and some have a "Z" orientation.

Referring back generally to FIGS. 1-3, the housing 120*a* of the acoustic damper 100*a* includes a base 122*a* and one or more sides 126*a*. The base 120*a* includes a multitude of feed apertures 123*a* therein. The feed apertures 123*a* are shown as being generally circular apertures in the base 122*a*, each having the same size, although each of the feed apertures 123*a* can have any shape and can have any size (e.g., all the same within the base 122*a* or one or more being different from the others within the base 122*a*). For example, instead of the feed apertures 123*a* being circular apertures, the feed apertures can be elongated generally S-shaped slots like the S-shaped slot 200.

As shown, the base 122*a* is curved and generally angled relative to the low porosity layer section 110*a* and/or the outer surface 51 (FIG. 6) of the liner 50. In some implementations, depending on the geometry of the gas turbine combustor (not shown) including the acoustic dampers of the present disclosure, the base 122*a*, or a portion thereof, is angled relative to the low porosity layer section 110*a* due to space constraints within the gas turbine combustor about the liner 50. As shown, the base 122*a* is angled relative to the low porosity layer section 110*a* at an angle of about 10 degrees. Alternatively, the base 122*a* of the housing 120 is generally positioned at an angle relative to the low porosity layer section 110*a* (or relative to vertical) at an angle of, for example, between about 0 degrees and about 60 degrees, between about 0 degrees and about 45 degrees, between about 5 degrees and about 30 degrees, between about 10 degrees and about 15 degrees. In some alternative implementations, the base 122*a* of the housing 120 or a portion thereof is not angled relative to the low porosity layer section 110*a* and/or the outer surface 51 (FIG. 6) of the liner 50, but rather, the base 122*a* is parallel with or generally parallel with the low porosity layer section 110*a* and/or the outer surface of the liner 50.

The base 122*a* of the housing 120*a* has a thickness that can be between about 0.5 millimeters and about 30 millimeters, which can be selected when tuning/designing the first acoustic damper 100*a* to dampen a specific range/band of frequencies of acoustic energy. Similarly, the low porosity layer section 110*a* (and thus the liner 50) has a thickness that can be between about 0.5 millimeters and about 10 millimeters, which can be selected when tuning/designing the first acoustic damper 100*a* to dampen/attenuate a specific range/band of frequencies of acoustic energy.

As shown, the one or more sides 126*a* of the housing 120*a* extend from the base 122*a* to the liner 50. The one or more sides 126*a* of the housing 120*a* is shown as including four sides that are connected in a generally rectangular shape; however, the one or more sides 126*a* of the housing 120*a* can include any number of sides (e.g., one side, two sides, three sides, four sides, five sides, six sides, ten sides, etc.) and can be connected in any shape (e.g., square, rectangle, triangle, circle, oval, polygon, etc., or any combination thereof). As shown, the one or more sides 126*a* do not include feed apertures, although in some implementations, a portion or all of the one or more sides 126*a* include feed apertures therein. Further, each of the illustrated four sides 126*a* has a different profile/shape such that the base 122*a* is angled relative to the low porosity layer section 110*a* and/or the outer surface 51 (FIG. 6) of the liner 50 as described above.

While the housing 120*a* is shown as including separate components (e.g., the base 122*a* and the one or more sides 126*a*), in some implementations, the housing 120*a* is a single monolithic component.

As shown in FIG. 1, the housing 120*a* is coupled to the liner 50, thereby forming the first acoustic damper 100*a*, such that the one or more sides 126*a* of the housing 120*a* are positioned about the low porosity layer section 110*a*. The housing 120 can be coupled to the liner 50 by any means, such as, for example, welding (e.g., arc welding, sonic welding, etc.), glue, tape, fasteners (e.g., nuts and bolts, screws, nails, etc.), or any combination thereof.

Figure 4:
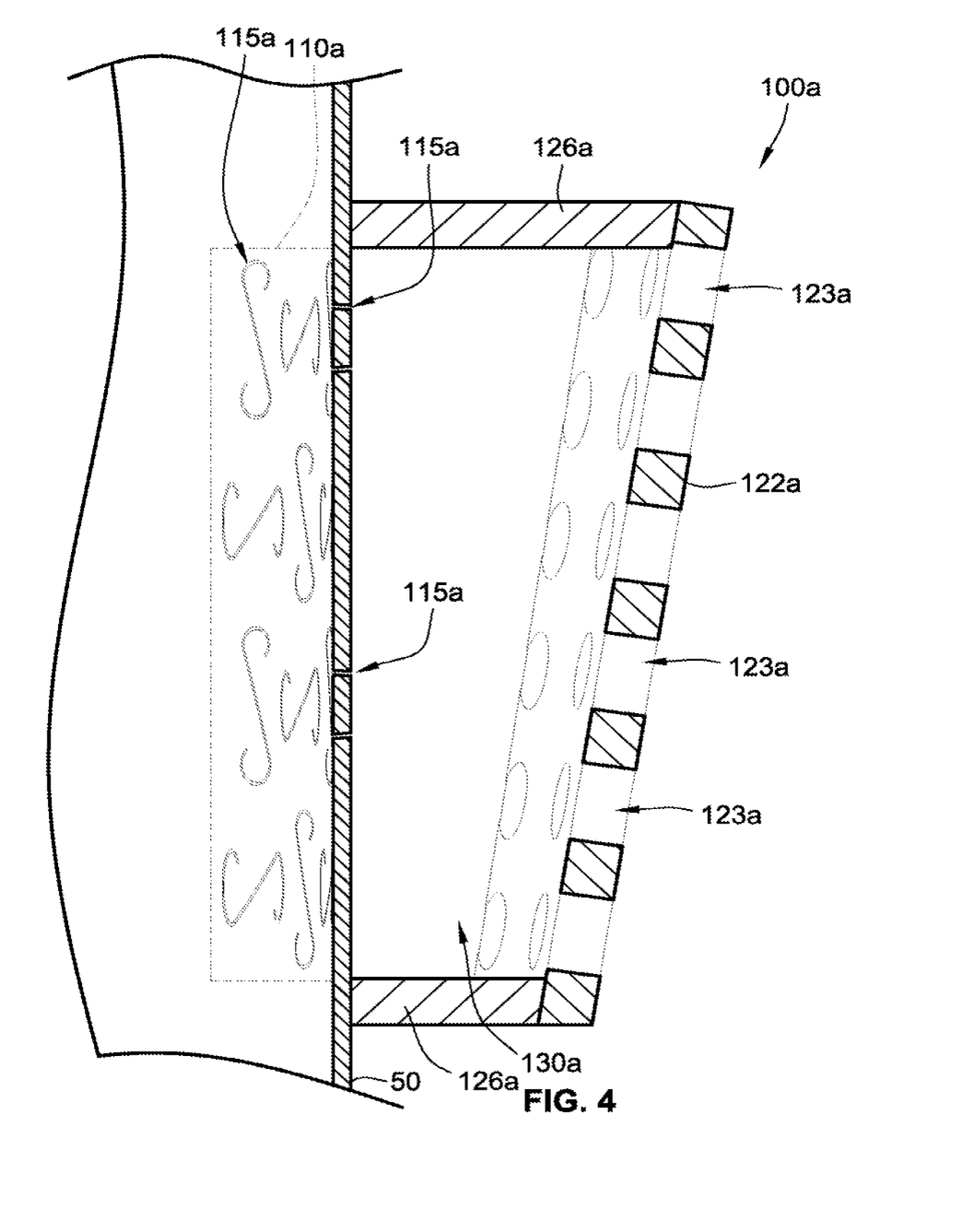
FIG. 4 is a side cross-sectional view of a first acoustic damper of the acoustic damper system of FIG. 1.

Once attached to liner 50, the housing 120*a* defines a cavity 130*a* (e.g., a resonating cavity) generally between the base 122*a*, the liner 50, and the one or more sides 126*a*, a portion of the cavity 130*a* is shown in FIGS. 3 and 4.

Figure 6:
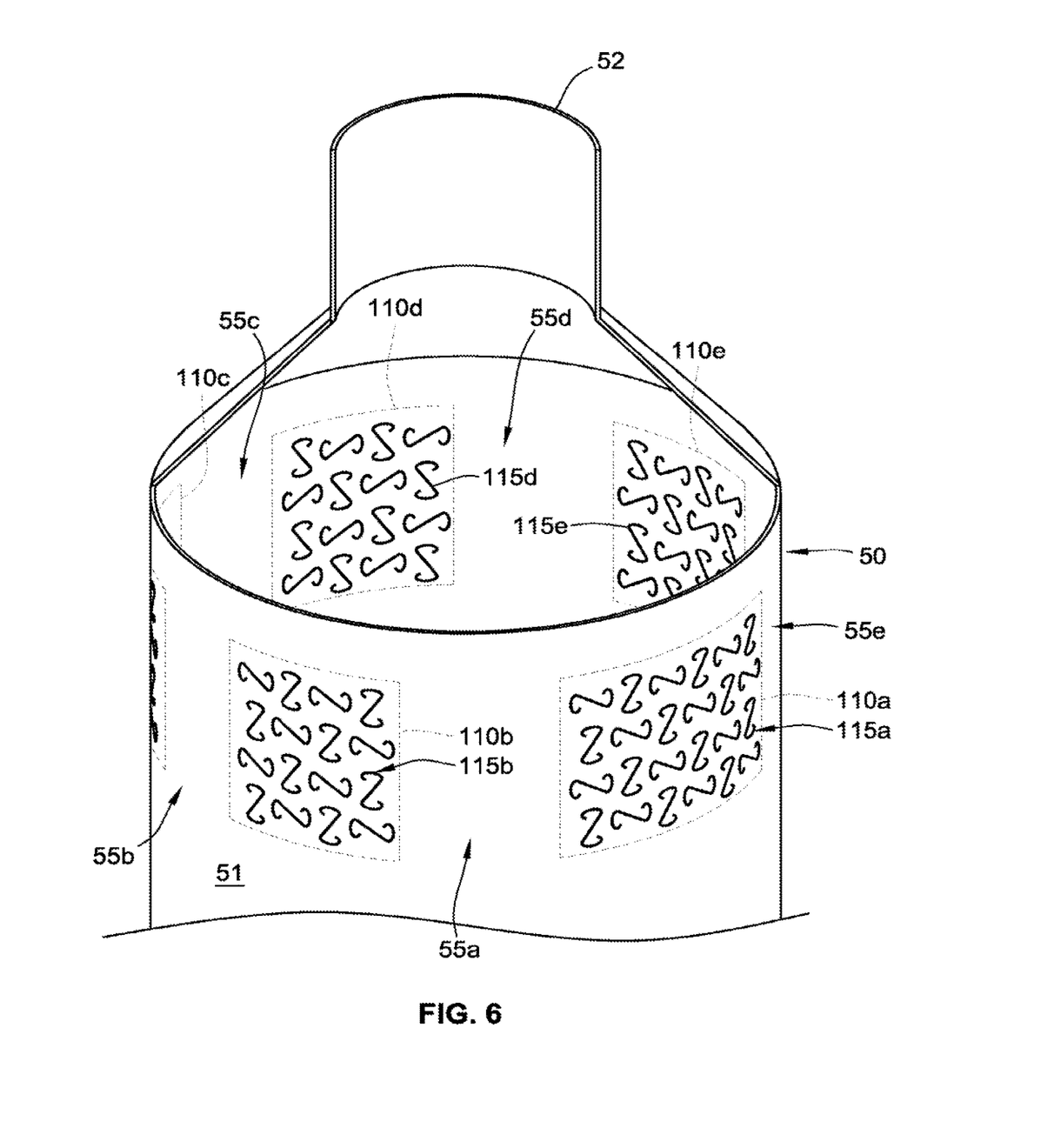
FIG. 6 is a perspective view of a liner of the acoustic damper system of FIG. 1, where the liner has a multitude of low porosity layer sections, each including a multitude of S-shaped slots.

The first acoustic damper 100*b* is tuned/designed in conjunction with the gas turbine combustor such that air outside the housing 120*a* (e.g., cooling air) is permitted and/or biased to flow through at least a portion of the feed apertures 123*a* (e.g., some of or all of the feed apertures 123*a*) and into the housing 120*a* (e.g., in the cavity 130*a*) and then from the cavity 130*a* through at least a portion of the arrangement of elongated generally S-shaped slots 115*a* (e.g., some of or all of the arrangement of elongated generally S-shaped slots 115*a*) in the low porosity layer section 110*a* (FIGS. 2 and 6). Such a flow of the air (e.g., cooling air) through the first acoustic damper 100*a* transforms acoustic energy (e.g., acoustic energy generated by the gas turbine combustor at least partially within the liner 50) into thermal energy and aids in providing an acoustic dampening effect for the gas turbine combustor during operation thereof. By biased it is meant that the first acoustic damper 100*a* is designed in conjunction with the gas turbine combustor such that the flow of air is directed to flow through the first acoustic damper 100*a* and into the liner 50 as opposed to flowing from the liner 50 and out of the feed apertures 123*a*. However, during operation of the gas turbine combustor and the first acoustic damper 100*a*, pressure fluctuations (e.g., caused by the operation of the gas turbine combustor and resonance in the first acoustic damper 100*a*) will cause the flow rate of the bias flow to fluctuate up and down.

Further, once attached to liner 50 (e.g., the first acoustic damper 100*a* is assembled), the base 122*a* of the housing 120*a* is spaced a distance from the low porosity layer section 110*a* and at an angle relative to the low porosity layer section 110*a*. The distance and/or the angle can be selected when tuning/designing the acoustic damper 100a to dampen a specific range/band of frequencies of acoustic energy. In some implementations, the distance between the base 122a and the low porosity layer section 110a is between about twenty millimeters and about five hundred millimeters. Further, any of the other parameters (e.g., dimensions, angles, thicknesses, widths, lengths, heights, shapes, etc.) of the first acoustic damper 100a can be selected/altered when tuning/designing the acoustic damper 100a to dampen a specific range/band of frequencies of acoustic energy.

Referring generally to FIGS. 1-3 and 5, the second acoustic damper 100b is the same as, or similar to, the first acoustic damper 100a in that the second acoustic damper 100b includes a low porosity layer section 110b and a housing 120b, which are the same as, or similar to, the low porosity layer section 110a and the housing 120a of the first acoustic damper 100a. In some implementations, the parameters of the low porosity layer section 110b and/or of the housing 120b differ in one or more aspects from the parameters of the low porosity layer section 110a and/or of the housing 120a such that the second acoustic damper 100b is tuned/designed to dampen/attenuate a range/band of frequencies of acoustic energy that is different from the range/band of frequencies of acoustic energy that the first acoustic damper 100a is tuned/designed to dampen/attenuate.

Additionally, the second acoustic damper 100b differs from the first acoustic damper 100a in that the second acoustic damper 100b further includes a metering layer 140b. The metering layer 140b includes a multitude of metering apertures 143b therein. The metering apertures 143b are shown as being generally circular apertures in the metering layer 140b, each having the same size, although each of the metering apertures 143b can have any shape and can have any size (e.g., all the same within the metering layer 140b or one or more being different from the others within the metering layer 140b). For example, instead of the metering apertures 143b being circular apertures, the metering apertures can be elongated generally S-shaped slots like the S-shaped slot 200, and/or a combination thereof. Further, a porosity of one metering layer to another metering layer within a single acoustic damper (e.g., a multiple skin acoustic damper) or from one acoustic damper to the next (e.g., an acoustic damper system with two or more multiple skin acoustic dampers) can be the same or can be different.

Figure 5:
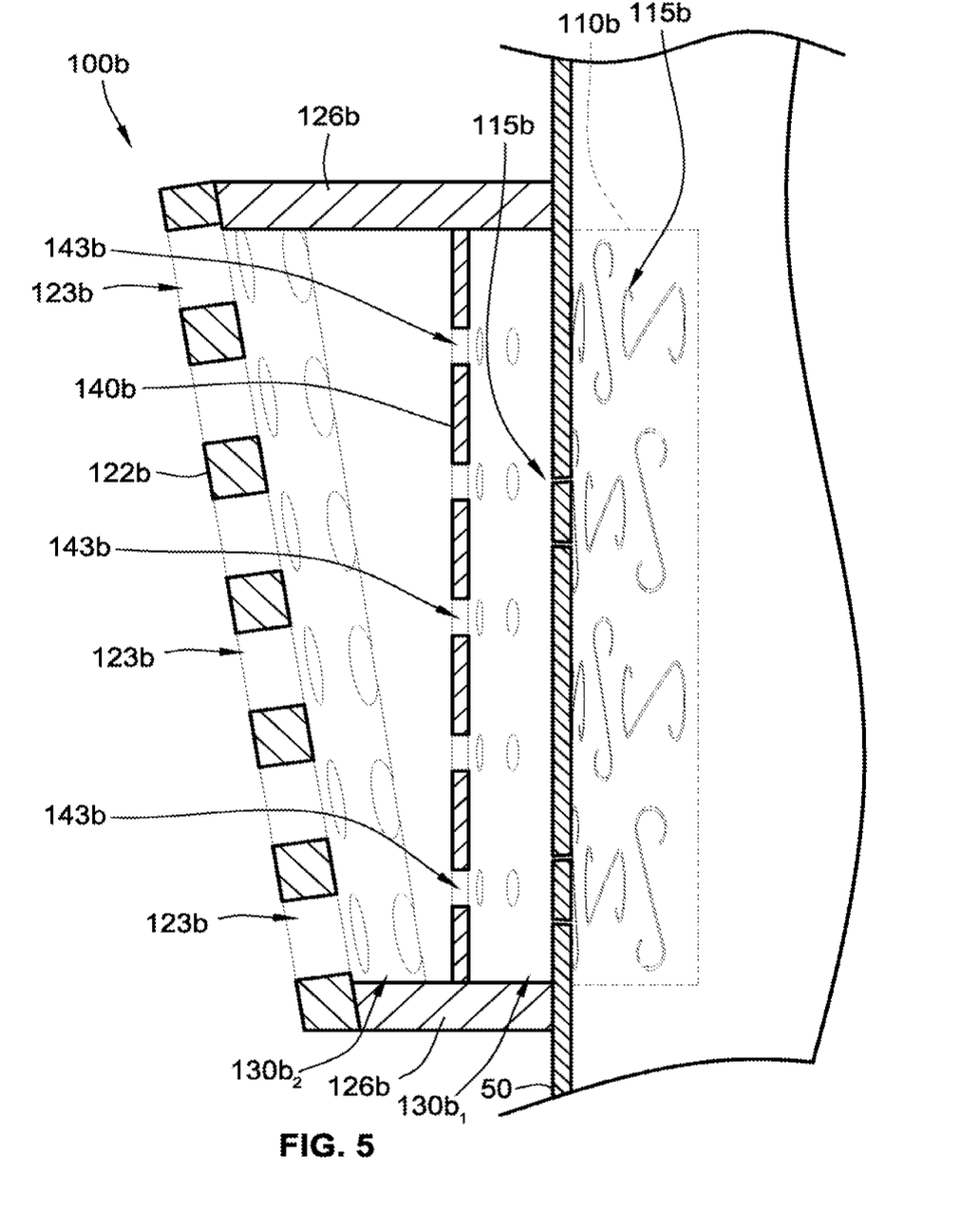
FIG. 5 is a side cross-sectional view of a second acoustic damper of the acoustic damper system of FIG. 1.

The metering layer 140b is positioned within the housing 120b and spaced a first distance from the liner 50 and a second distance from the base 122b, thereby defining a first cavity 130b1 and a second cavity 130b2. A portion of each of the cavities 130b1, 130b2 is shown in FIGS. 3 and 5. In some implementations, the first distance is between about five millimeters and about one hundred millimeters and the second distance is between about five millimeters and about four hundred millimeters.

The second acoustic damper 100b is tuned/designed in conjunction with the gas turbine combustor such that air outside the housing 120b (e.g., cooling air) is permitted and/or biased to flow through at least a portion of the feed apertures 123b (e.g., some of or all of the feed apertures 123b) and into the second cavity 130b2. Then air flows from the second cavity 130b2 through at least a portion of the metering apertures 143b (e.g., some of or all of the metering apertures 143b) and into the first cavity 130b1. Then air flows from the first cavity 130b1 through at least a portion of the arrangement of elongated generally S-shaped slots 115b (e.g., some of or all of the arrangement of elongated generally S-shaped slots 115b) in the low porosity layer section 110b (FIGS. 2 and 6). Such a flow of the air (e.g., cooling air) through the second acoustic damper 100b transforms acoustic energy (e.g., acoustic energy generated by the gas turbine combustor at least partially within the liner 50) into thermal energy and aids in providing an acoustic dampening effect for the gas turbine combustor during operation thereof. By biased it is meant that the second acoustic damper 100b is designed in conjunction with the gas turbine combustor such that the flow of air is directed to flow through the second acoustic damper 100b and into the liner 50 as opposed to flowing from the liner 50 and out of the feed apertures 123b. However, during operation of the gas turbine combustor and the second acoustic damper 100b, pressure fluctuations (e.g., caused by the operation of the gas turbine combustor and resonance in the acoustic damper) will cause the flow rate of the bias flow to fluctuate up and down.

As shown, the metering layer 140b is curved and generally parallel with the low porosity layer section 110b and at an angle relative to the base 122b. Alternatively, the metering layer 140b or a portion thereof is parallel with the base 122b and not parallel with the low porosity layer section 110b. Further, in some alternative implementations, the metering layer 140b or a portion thereof is not parallel with the base 122b and not parallel with the low porosity layer section 110b. The metering layer 140b has a thickness that can be between about 0.5 millimeters and about 30 millimeters, which can be selected when tuning/designing the second acoustic damper 100b to dampen a specific range/band of frequencies of acoustic energy. Similarly, the low porosity layer section 110b (and thus the liner 50) has a thickness that can be between about 0.5 millimeters and about 10 millimeters, which can be selected when tuning/designing the second acoustic damper 100a to dampen/attenuate a specific range/band of frequencies of acoustic energy.

While not shown in the second acoustic damper 100b, the second acoustic damper 100b (or any of the acoustic dampers of the present disclosure) can include a second metering layer within the housing. As such, the cavity of the housing is divided into three sub-cavities as compared to the two sub-cavities (e.g., cavities 130b1 and 130b2) of the second acoustic damper 100b. Further, in some implementations, three or more metering layers are included in the acoustic damper of the present disclosure, thereby dividing the cavity into four or more sub-cavities.

While the first acoustic damper 100a (not including a metering layer) and the second acoustic damper 100b (including the metering layer 140b) are shown as being positioned about the same liner 50, in some implementations, none of the acoustic dampers positioned about the liner 50 include a metering layer (not shown). Alternatively, all of the acoustic dampers positioned about the liner 50 include one or more metering layers (not shown).

Referring generally to FIGS. 1 and 6, each of the acoustic dampers 100a-e includes a low porosity layer section 110a-e, which is best shown in FIG. 6 of the liner 50. Each of the low porosity layer section 110a-e includes an arrangement of elongated generally S-shaped slots 115a-e formed therein, respectively. The low porosity layer sections 110a-e are spaced from one another about the liner 50 of the gas turbine combustor such that non-porous portions 55a-e of the liner 50 are defined between the low porosity layer section 110a-e. By non-porous portion, it is meant that the portion of the liner does not include any apertures (e.g., feed apertures) or slots (e.g., elongated S-shaped slots) or holes therein.

As shown, a first non-porous portion 55a is defined generally as the surface of the liner 50 between the first low porosity layer section 110a and the second low porosity layer section 110b. Similarly, a second non-porous portion 55b is defined generally as the surface of the liner 50 between the second low porosity layer section 110b and the third low porosity layer section 110c; the third non-porous portion 55c is defined generally as the surface of the liner 50 between the third low porosity layer section 110c and the fourth low porosity layer section 110d; the fourth non-porous portion 55d is defined generally as the surface of the liner 50 between the fourth low porosity layer section 110d and the fifth low porosity layer section 110e; and the fifth non-porous portion 55e is defined generally as the surface of the liner 50 between the fifth low porosity layer section 110e and the first low porosity layer section 110a.

Alternatively, instead of the non-porous portions 55a-e not having any apertures (e.g., feed apertures) or slots (e.g., elongated S-shaped slots) or holes therein, in some alternative implementations, one or more of the non-porous portions 55a-e includes one or more cooling apertures, such as, for example, one or more feed apertures, one or more slots (e.g., elongated S-shaped slots), one or more holes, or any combination thereof (e.g., only circular feed apertures, only elongated S-shaped slots, a combination thereof, etc.).

In addition to the non-porous portions 55a-e not having any apertures (e.g., feed apertures) or slots (e.g., elongated S-shaped slots) or holes therein, the portions above and below the low porosity layer section 110a-e do not have any apertures (e.g., feed apertures) or slots (e.g., elongated S-shaped slots) or holes therein. For example, the second low porosity layer section 110b has a generally square shape/footprint and portions of the liner 50 adjacent to (e.g., directly adjacent to) all four sides of the square shape do not have any apertures (e.g., feed apertures) or slots (e.g., elongated S-shaped slots) or holes therein. Put another way, regardless of the shape of the second low porosity layer section 110b, in some implementations, as shown in FIG. 6, the portion of the liner 50 that directly surrounds the second low porosity layer section 110b does not have any apertures (e.g., feed apertures) or slots (e.g., elongated S-shaped slots) or holes therein. In some implementations, portions of the liner 50 adjacent to only one or only two or only three of the sides of the generally square shape do not have any apertures (e.g., feed apertures) or slots (e.g., elongated S-shaped slots) or holes therein.

As best shown in FIG. 6, the low porosity layer sections 110a-e are formed in the liner 50 such that the low porosity layer sections 110a-e are monolithic and/or integral with the liner 50. Alternatively, in some implementations, the low porosity layer sections 110a-e are separate and distinct from the liner 50 and coupled thereto. In some such alternative implementations, the liner 50 includes an opening at the location of each of the acoustic dampers 100a-e and the low porosity layer sections 110a-e are coupled to the liner 50 at or near the openings. In some implementations, the low porosity layer sections 110a-e and/or the liner 50 is made of a polycrystalline alloy and/or a single-crystal alloy. In some implementations, the low porosity layer sections 110a-e and/or the liner 50 is made of a nickel-base superalloy, an iron-nickel-base superalloy, a cobalt-base superalloy, or any combination thereof.

Referring to FIG. 1, as shown, the acoustic dampers 100a-e (and their respective low porosity layer sections 110a-e) are positioned in a single circumferentially extending portion of the liner 50. Put another way, the acoustic dampers 100a-e are in a single row about the liner 50. Alternatively, the acoustic dampers 100a-e can be positioned in two or more rows (e.g., one row, two rows, three rows, ten rows, etc.) about the liner 50 such that, for example, a first one of the acoustic dampers and its low porosity layer section is positioned in a first circumferentially extending portion of the liner 50 and a second one of the acoustic dampers and its low porosity layer section is positioned in a second circumferentially extending portion of the liner 50 that is laterally offset from the first circumferentially extending portion of the liner 50.

As described herein, each of the acoustic dampers 100a-e can vary from the other ones in one or more ways. By way of example, in some implementations, a first arrangement of elongated generally S-shaped slots (e.g., arrangement 115a) of a first one of the acoustic dampers 100a-e (e.g., the first acoustic damper 100a) has a first spacing (e.g., horizontal and/or vertical) between adjacent ones of the elongated S-shaped slots and a second arrangement of elongated generally S-shaped slots (e.g., arrangement 115b) of a second one of the acoustic dampers 100a-e (e.g., the second acoustic damper 100b) has a second spacing (e.g., horizontal and/or vertical) between adjacent ones of the elongated S-shaped slots that is different from the first spacing (e.g., the horizontal spacing and/or the vertical spacing is different).

For another example, in some implementations, a first cavity (e.g., cavity 130a) of a first one of the acoustic dampers 100a-e (e.g., the first acoustic damper 100a) has a first volume and a second cavity of a second one of the acoustic dampers 100a-e (e.g., the third acoustic damper 100c) has a second volume that is different from the first volume.

For another example, in some implementations, each of a first plurality of feed apertures (e.g., feed apertures 123a) of a first one of the acoustic dampers 100a-e (e.g., the first acoustic damper 100a) has a first aperture size and each of a second plurality of feed apertures (e.g., feed apertures 123b) of a second one of the acoustic dampers 100a-e (e.g., the second acoustic damper 100b) has a second aperture size that is different from the first aperture size.

For another example, in some implementations, a first plurality of feed apertures (e.g., feed apertures 123a) of a first one of the acoustic dampers 100a-e (e.g., the first acoustic damper 100a) includes a first number of feed apertures (e.g., 10, 20, 30, 50, 100, etc.) and a second plurality of feed apertures (e.g., feed apertures 123b) of a second one of the acoustic dampers 100a-e (e.g., the second acoustic damper 100b) includes a second number of feed apertures (e.g., 10, 20, 30, 50, 100, etc.) that is different from the first number of feed apertures. In some such implementations, each of the first plurality of feed apertures has a first aperture size that is the same as or different from a second aperture size of each of the second plurality of feed apertures.

For another example, in some implementations, a first low porosity layer section (e.g., first low porosity layer section 110a) of a first one of the acoustic dampers 100a-e (e.g., the first acoustic damper 100a) has a first porosity and a second low porosity layer section of a second one of the acoustic dampers 100a-e (e.g., the second acoustic damper 100b) has a second porosity that is different from the first porosity.

Figure 8:
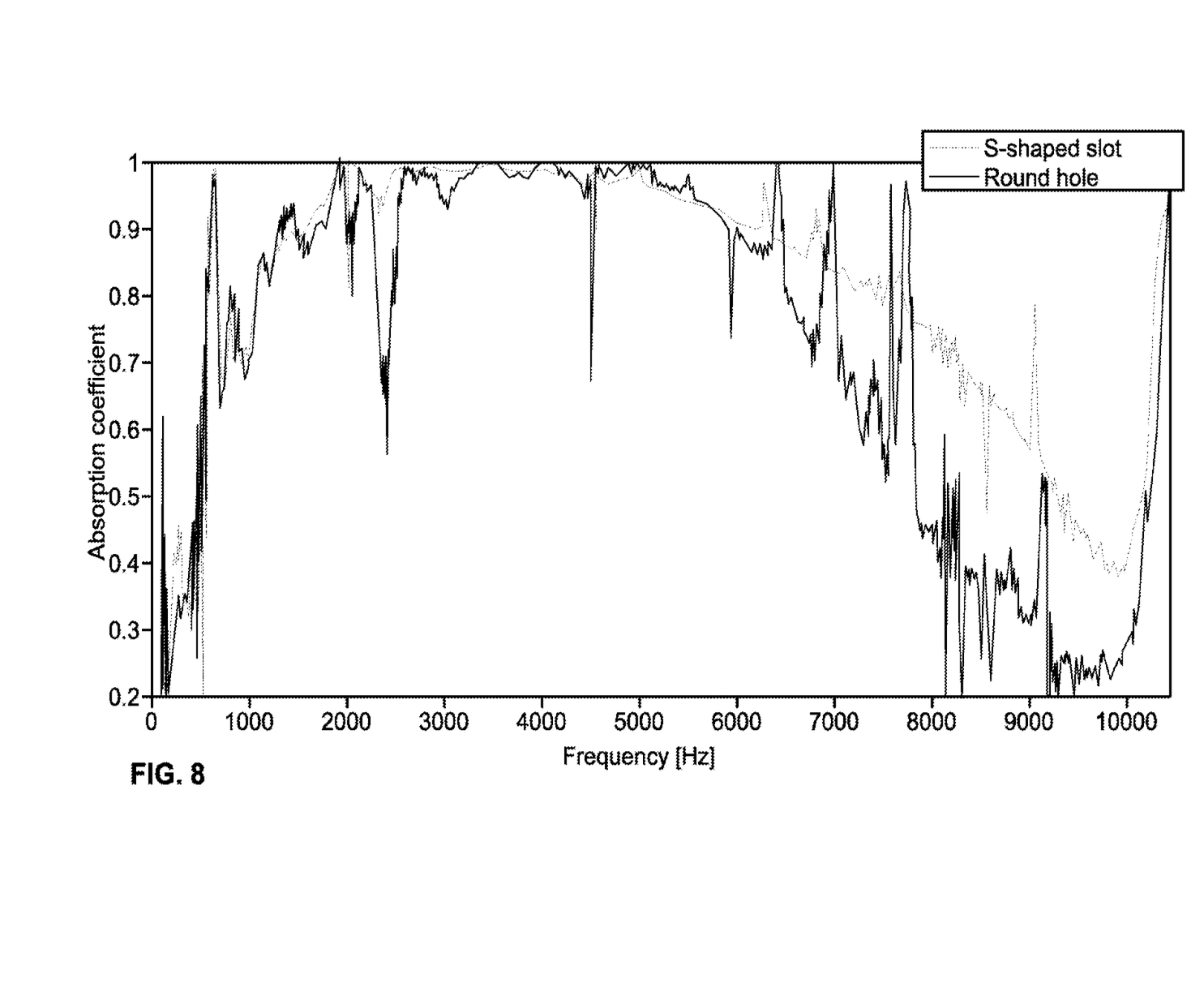
FIG. 8 is a plot of absorption coefficients versus frequency for an acoustic damper of the present disclosure.

As mentioned herein, acoustic dampers of the present disclosure including the low porosity layer sections with S-shaped slots surprisingly performed better than prior acoustic dampers with round holes. In an effort to illustrate such improved performance, several test/experiments were done to measure the absorption coefficient for an acoustic damper for a range of frequencies of acoustic energy from 0 Hz to 10,000 Hz, the results of some of those tests on an impedance tube are shown in FIG. 8 for a bias flow resulting from a 0.5 percent pressure drop across the low porosity layer (the configuration tested did not have a metering layer, the effective porosity (≈3%) and the number of holes was the same for the sample with round holes and for the sample with S-shaped slots).

The absorption coefficient, α, is defined as $\alpha=[1-I_R/I_I]$, where $I_I$ is the sound intensity of the pressure wave incident on the low porosity layer section of the acoustic damper and $I_R$ is the sound intensity of the pressure wave reflected off the low porosity layer section of the acoustic damper. Acoustic dampers that reflect less acoustic energy perform better as they absorb more of the acoustic energy. Thus, a relatively higher absorption coefficient corresponds to relatively better acoustic damper and/or relatively better damping performance (e.g., more attenuation of acoustic energy).

The tests are impacted by a number of factors/variables. For example, the size of the housing and thus the cavity impact the tests. Further the following parameters impact the tests, the bias flow (e.g., pressure drops of 0.5%, 0.2%, etc.), the resonant frequency of the housing/cavity/acoustic damper, all of the parameters of the low porosity layer section described herein, etc.

According to some implementations of the present disclosure, for a first acoustic damper including a housing sized to resonate near 2500 Hz, no metering layer, and for a pressure drop over a low porosity layer of the first acoustic damper corresponding to 0.5 percent, an absorption coefficient of the first acoustic damper between about 7000 Hz and about 8000 Hz is between about 0.7 and about 0.8. According to some such implementations, each elongated generally S-shaped slot in the arrangement of the low porosity layer section has a slot thickness between about 0.15 millimeters and about 0.28 millimeters. According to some such implementations, the low porosity layer has a porosity of about three percent.

According to some implementations of the present disclosure, for a second acoustic damper including a housing sized to resonate near 2500 Hz, no metering layer, and for a pressure drop over a low porosity layer of the second acoustic damper corresponding to 0.5 percent, an absorption coefficient of the second acoustic damper between about 8000 Hz and about 9000 Hz is between about 0.6 and about 0.7. According to some such implementations, each elongated generally S-shaped slot in the arrangement of the low porosity layer section has a slot thickness between about 0.15 millimeters and about 0.28 millimeters. According to some such implementations, the low porosity layer has a porosity of about three percent.

According to some implementations of the present disclosure, for a third acoustic damper including a housing sized to resonate near 2500 Hz, no metering layer, and for a pressure drop over a low porosity layer of the third acoustic damper corresponding to 0.5 percent, an absorption coefficient of the third acoustic damper between about 9000 Hz and about 10000 Hz is between about 0.4 and about 0.6. According to some such implementations, each elongated generally S-shaped slot in the arrangement of the low porosity layer section has a slot thickness between about 0.15 millimeters and about 0.28 millimeters. According to some such implementations, the low porosity layer has a porosity of about three percent.

According to some implementations of the present disclosure, for a fourth acoustic damper including a housing sized to resonate near 2500 Hz, no metering layer, and for a pressure drop over a low porosity layer of the fourth acoustic damper corresponding to 0.2 percent, an absorption coefficient of the fourth acoustic damper between about 7000 Hz and about 8000 Hz is between about 0.6 and about 0.9. According to some such implementations, each elongated generally S-shaped slot in the arrangement of the low porosity layer section has a slot thickness between about 0.15 millimeters and about 0.28 millimeters. According to some such implementations, the low porosity layer has a porosity of about three percent.

According to some implementations of the present disclosure, for a fifth acoustic damper including a housing sized to resonate near 2500 Hz, no metering layer, and for a pressure drop over a low porosity layer of the fifth acoustic damper corresponding to 0.2 percent, an absorption coefficient of the fifth acoustic damper between about 8000 Hz and about 9000 Hz is between about 0.5 and about 0.8. According to some such implementations, each elongated generally S-shaped slot in the arrangement of the low porosity layer section has a slot thickness between about 0.15 millimeters and about 0.28 millimeters. According to some such implementations, the low porosity layer has a porosity of about three percent.

According to some implementations of the present disclosure, for a sixth acoustic damper including a housing sized to resonate near 2500 Hz, no metering layer, and for a pressure drop over a low porosity layer of the sixth acoustic damper corresponding to 0.2 percent, an absorption coefficient of the sixth acoustic damper between about 9000 Hz and about 10000 Hz is between about 0.35 and about 0.6. According to some such implementations, each elongated generally S-shaped slot in the arrangement of the low porosity layer section has a slot thickness between about 0.15 millimeters and about 0.28 millimeters. According to some such implementations, the low porosity layer has a porosity of about three percent.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. An acoustic damper system for a gas turbine combustor, the system comprising:
a first low porosity layer section formed in a liner of the gas turbine combustor, the first low porosity layer section having a first arrangement of elongated generally S-shaped slots formed therein;
a first housing having a first plurality of feed apertures, the first housing being coupled to the first low porosity layer section thereby defining a first cavity, air outside the first housing being configured to flow through at least a portion of the first plurality of feed apertures in the first housing and through at least a portion of the first arrangement of elongated generally S-shaped slots in the first low porosity layer, thereby transforming a first range of frequencies of acoustic energy into thermal energy and aiding in providing an acoustic dampening effect on the first range of frequencies of acoustic energy for the gas turbine combustor during operation thereof;
a second low porosity layer section formed in the liner of the gas turbine combustor, the second low porosity layer section having a second arrangement of elongated generally S-shaped slots formed therein; and a second housing having a second plurality of feed apertures, the second housing being coupled to the second low porosity layer section thereby defining a second cavity, air outside the second housing being configured to flow through at least a portion of the second plurality of feed apertures in the second housing and through at least a portion of the second arrangement of elongated generally S-shaped slots in the second low porosity layer, thereby transforming a second range of frequencies of acoustic energy into thermal energy and aiding in providing an acoustic dampening effect on the second range of frequencies of acoustic energy for the gas turbine combustor during operation thereof;

a first metering layer having a first arrangement of apertures therein, the first metering layer being positioned within the first housing such that the first metering layer divides the cavity into a first sub-cavity and a second sub-cavity, and wherein the first metering layer is generally parallel with and spaced a distance from the first low porosity layer section, the distance being between five millimeters and one hundred millimeters; and a second metering layer having a second arrangement of apertures, the second metering layer being positioned within the first housing such that the first metering layer and the second metering layer divide the cavity into three sub-cavities, and wherein a porosity of the first arrangement of apertures is different from a porosity of the second arrangement of apertures.

2. The system of claim 1, wherein the first low porosity layer section is positioned in a first circumferentially extending portion of the liner and the second low porosity layer section is positioned in a second circumferentially extending portion of the liner that is laterally offset from the first circumferentially extending portion of the liner, and wherein the first range of frequencies of acoustic energy and the second range of frequencies of acoustic energy (i) are different, (ii) partially overlap, (iii) do not overlap, or (iv) overlap by less than 10 percent.

3. An acoustic damper for a gas turbine combustor, the acoustic damper comprising:

a low porosity layer section formed in a liner of the gas turbine combustor, the low porosity layer section having an arrangement of elongated generally S-shaped slots formed therein, each of the elongated generally S-shaped slots of the arrangement having a major axis, the major axes of a first plurality of the elongated generally S-shaped of the arrangement slots being generally perpendicular to the major axes of a second plurality of the elongated generally S-shaped slots of the arrangement;

a housing having a plurality of feed apertures, the housing being coupled to the low porosity layer section thereby defining a cavity, air outside the housing being configured to flow through at least a portion of the plurality of feed apertures in the housing and through at least a portion of the elongated generally S-shaped slots in the low porosity layer section, thereby transforming acoustic energy into thermal energy and aiding in providing an acoustic dampening effect for the gas turbine combustor during operation thereof;

a first metering layer having a first arrangement of apertures therein, the first metering layer being positioned within the housing such that the first metering layer divides the cavity into a first sub-cavity and a second sub-cavity, and wherein the first metering layer is generally parallel with and spaced a distance from the low porosity layer section, the distance being between five millimeters and one hundred millimeters; and a second metering layer having a second arrangement of apertures, the second metering layer being positioned within the housing such that the first metering layer and the second metering layer divide the cavity into three sub-cavities, and wherein a porosity of the first arrangement of apertures is different from a porosity of the second arrangement of apertures.

4. The acoustic damper of claim 3, wherein a flame in a flame region of the gas turbine combustor produces a highest acoustic amplitude of the gas turbine combustor and wherein the acoustic damper is positioned directly adjacent to the flame region of the gas turbine combustor to provide the acoustic dampening effect.

5. The acoustic damper of claim 3, wherein a portion of the liner directly surrounding the low porosity layer section does not include any (i) elongated generally S-shaped slots formed therein and (ii) feed apertures formed therein.

6. The acoustic damper of claim 3, wherein a portion of the liner directly surrounding the low porosity layer section includes one or more cooling apertures therein.

7. The acoustic damper of claim 3, wherein the low porosity layer section has a generally square shape with rounded corners and wherein portions of the liner directly adjacent to at least two sides of the low porosity layer section do not include any elongated generally S-shaped slots formed therein.

8. The acoustic damper of claim 3, wherein each of the elongated generally S-shaped slots of the arrangement has a slot thickness that is between 0.1 millimeters and 0.3 millimeters.

9. The acoustic damper of claim 3, wherein each of the elongated generally S-shaped slots includes:

an elongated generally straight slot portion having a first end and an opposing second end;

a first generally curved slot portion directly attached to the first end of the elongated generally straight slot portion; and a second generally curved slot portion directly attached to the opposing second end of the elongated generally straight slot portion, wherein the elongated generally straight slot portion has a length between three millimeters and twenty millimeters, and wherein the first generally curved slot portion has a first arc length between two millimeters and ten millimeters and wherein the second generally curved slot portion has a second arc length between two millimeters and ten millimeters.

10. The acoustic damper of claim 9, wherein the elongated generally straight slot portion of each respective elongated generally S-shaped slot corresponds to the major axis of the respective elongated generally S-shaped slot, and wherein the first generally curved slot portion of each respective elongated generally S-shaped slot extends from the respective elongated generally straight slot portion in a first direction and the second generally curved slot portion of each respective elongated generally S-shaped slot extends from the respective elongated generally straight slot portion in a second direction that is opposite from the first direction.

11. The acoustic damper of claim 3, wherein a porosity of the arrangement of elongated generally S-shaped slots is below twenty percent.

12. The acoustic damper of claim 3, responsive to the housing being sized to resonate at 2500 Hz and for a pressure drop over the low porosity layer corresponding to 0.5 percent, (i) an absorption coefficient of the acoustic damper between 7000 Hz and 8000 Hz is between 0.7 and 0.8, (ii) an absorption coefficient of the acoustic damper between 8000 Hz and 9000 Hz is between 0.6 and 0.7, (iii) an absorption coefficient of the acoustic damper between 9000 Hz and 10000 Hz is between 0.4 and 0.6, or (iv) any combination thereof.

13. The acoustic damper of claim 3, responsive to the housing being sized to resonate at 2500 Hz and for a pressure drop over the low porosity layer corresponding to 0.2 percent, (i) an absorption coefficient of the acoustic damper between 7000 Hz and 8000 Hz is between 0.6 and 0.9, (ii) an absorption coefficient of the acoustic damper between 8000 Hz and 9000 Hz is between 0.5 and 0.8, (iii) an absorption coefficient of the acoustic damper between 9000 Hz and 10000 Hz is between 0.35 and 0.6, or (iv) any combination thereof.

* * * * *